United States Patent [19]
Gouardères

[11] Patent Number: 5,623,036
[45] Date of Patent: Apr. 22, 1997

[54] METHOD FOR MAKING A SURFACE HYDROPHOBIC

[75] Inventor: René Gouardères, Pau-Idron, France

[73] Assignee: Elf Atochem S. A., Puteaux, France

[21] Appl. No.: 575,316

[22] Filed: Dec. 20, 1995

Related U.S. Application Data

[62] Division of Ser. No. 304,648, Sep. 12, 1994, abandoned, which is a division of Ser. No. 36,123, Mar. 23, 1993, abandoned.

[30] Foreign Application Priority Data

Mar. 27, 1992 [FR] France ................................. 92 03746

[51] Int. Cl.$^6$ ....................................................... C08F 18/20
[52] U.S. Cl. ........................................ 526/245; 427/393.5
[58] Field of Search ........................... 526/245; 427/393.5

[56] References Cited

U.S. PATENT DOCUMENTS

| | | |
|---|---|---|
| 3,378,609 | 4/1968 | Fasick et al. . |
| 4,166,165 | 8/1979 | Hisasue et al. ............ 526/245 |
| 4,256,856 | 3/1981 | Ito et al. ................... 526/245 |
| 4,513,129 | 4/1985 | Nakagawa et al. ............ 526/245 |

FOREIGN PATENT DOCUMENTS

| | | |
|---|---|---|
| 0248421A2 | 12/1987 | European Pat. Off. . |
| 2134978 | 1/1972 | Germany . |
| 62-10119 | 1/1987 | Japan ..................... 526/245 |
| 4-316840 | 11/1992 | Japan ..................... 428/421 |

Primary Examiner—Joseph L. Schofer
Assistant Examiner—N. Sarofim
Attorney, Agent, or Firm—Pennie & Edmonds

[57] ABSTRACT

Copolymers of ethylene, optionally substituted by a halogen atom, by two halogen atoms carried by the same carbon atom, or by a phenyl group, and of fluorinated (meth)acrylates of formula:

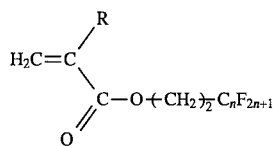

in which:
R is selected from hydrogen and methyl, and
n is an integer greater than or equal to 1.

Application of these copolymers to form, in particular, surfaces for gliding on snow or water.

11 Claims, No Drawings

METHOD FOR MAKING A SURFACE HYDROPHOBIC

This is a division of application Ser. No. 08/304,648, filed Sep. 12, 1994 now abandoned, which is a division of Ser. No. 08/036,123, filed Mar. 23, 1993, abandoned.

The present invention relates to copolymers of ethylene or of ethylene derivatives and of fluorinated (meth)acrylates, to a process for their manufacture and to their application to form gliding surfaces.

Numerous gliding surfaces and especially ski soles are frequently made of polyethylene.

In such applications an expert in the art chooses a polyethylene which has a hot melt index (or Melt Index, measured according to ASTM standard D 1238-62 T) of between 2 and 20 and preferably between 4 and 15. In fact, a melt index lower than 2 is characteristic of a long-chain polymer which is difficult to apply because of its excessive hardness. Conversely, a melt index higher than 20 indicates a short-chain polymer which is soft and which exhibits an excessive liability to erosion.

Furthermore, it is known that gliding properties, especially of ski soles, are proportionately better the lower the free surface energy of the material of the contact surface.

Fluorinated derivatives are commonly employed to lower the free surface energy of ski soles; perfluorinated waxes in particular are applied to the sole surfaces. However, waxing operations demand time, a certain know-how and must be frequently renewed.

There is therefore a perceived need for developing materials exhibiting both appropriate melt indices, as described above, and lowered free surface energies, especially when compared with those of the polyethylenes which usually form part of the make-up of ski soles. The present invention is aimed at responding to this need.

The subject of the present invention is thus copolymers of monomers of formula

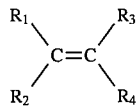

(I)

in which:
$R_1$, $R_2$, $R_3$ and $R_4$ are hydrogen, or
$R_1$ is selected from chlorine and fluorine and $R_2$, $R_3$ and $R_4$ are hydrogen, or
$R_1$ and $R_2$ are both selected from chlorine and fluorine and $R_3$ and $R_4$ are hydrogen, or
$R_1$ is phenyl and $R_2$, $R_3$ and $R_4$ are hydrogen
and of fluorinated (meth)acrylates of formula:

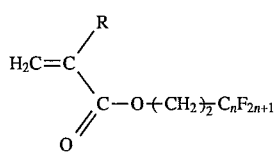

(II)

in which:
R is selected from hydrogen and methyl and
n is an integer greater than or equal to 1, the copolymers exhibiting a random chain sequencing of the comonomers and containing 0.1 to 30% by weight of fluorinated (methy)acrylates of formula II.

Preferred copolymers are obtained from ethylene and acrylates of formula (II) in which R is hydrogen and n is between 4 and 10, and still more particularly n is a number from 6 to 8.

The copolymers preferably contain 1 to 20% by weight of fluorinated (methy)acrylates of formula III.

A further subject of the present invention is a process for bulk copolymerisation of monomers of formula (I) and of fluorinated (meth)acrylates of formula (II), in which:

the monomer of formula (I) is introduced in the gaseous state, then it is gradually taken in the reactor to the reaction pressure of between $8 \times 10^7$ and $25 \times 10^7$ Pa, the fluorinated (meth) acrylate comonomer and a copolymerisation initiator are injected into the stream of monomer of formula (I) at the entry of the reactor, the reaction is performed at a temperature of 150° to 300° C. for 10 seconds to 5 minutes, then the copolymer and the residual monomers are removed and are separated by gradually lowering the pressure.

This process may be implemented in suitable conventional plants, either noncontinuously or continuously.

The quantity of (meth)acrylate injected generally represents 0.1 to 2% by weight and, preferably, 0.3 to 1% by weight relative to the weight of monomer of formula (I) introduced. However, because of a reactivity ratio which promotes the incorporation of the (meth)acrylate, a mass concentration of (meth)acrylate which is 4 to 8 times higher than that of the reaction mixture of the two monomers is found in the copolymer produced.

The fluorinated (meth)acrylate can be injected pure or diluted in a solvent. In the latter case the solvent for the fluorinated (meth)acrylate does not take part in the reaction, its function consisting solely in conveying the (meth)acrylate. This solvent may consist of any appropriate solvent such as an organic solvent, and especially a saturated hydrocarbon, and still more particularly hexane or heptane.

The concentration of the (meth)acrylate in this solvent is chosen as a function of the minimum throughput of the (meth)acrylate injection pump.

Introduction of one or a number of copolymerisation initiators is necessary. This initiator, injected at the reactor head, is chosen for its immediate decomposition under the reaction conditions and its activity throughout the reaction. Peroxides will be especially mentioned and more particularly tert-butyl perpivalate and tert-butyl perbenzoate.

The initiator is injected in solution in an appropriate solvent, preferably of the same kind as that for the (meth)acrylic comonomer. The quantity of initiator used, in relation to the total weight of the monomers introduced, is between 0.001 and 5% by weight and preferably between 0.005 and 2% by weight.

The copolymerisation reaction is exothermic and when the operation is carried out noncontinuously, the temperature in the reactor varies from 150° to 300° C.; in continuous operation the temperature in the reactor is between these values.

The reaction time is preferably between 30 seconds and 2 minutes.

Under the temperature and high pressure conditions of the reaction the copolymer produced forms a single-phase mixture in the supercritical state with the monomers.

At the reactor exit the separation of the copolymer obtained and of the residual monomers in the gaseous state may be performed, after progressive decrease in pressure.

Furthermore, the expert in the art is capable of simultaneously setting all the parameters of the reaction, such as nature(s) and quantity(ies) of initiator(s), quantities of monomers, temperatures and pressures, in order to obtain copolymers of intended melt index at a desired degree of conversion.

Another subject of the present invention is the use of the copolymers of monomers of formula (I) and of fluorinated (meth)acrylates of formula (II) in the manufacture of articles intended to glide on snow or water, especially ski soles, boat hulls, sailboards or surfboards.

In fact, owing to their melt index and free surface energy properties, these copolymers exhibit a greatly facilitated processability and provide an improved slip.

Another subject of the present invention is a process for improving the gliding of water over a surface, especially a windscreen, a window pane or a water conduit with decrease in pressure drop, a process which consists in applying to this surface a layer of a copolymer of monomers of formula (I) and of formula (II).

Finally, a further subject of the present invention is a process for protecting a surface by imparting a hydrophobic nature to it, which consists in applying to the surface a copolymer of monomers of formula (I) and of formula (II). An antimist effect or antigraffiti effect can thus in particular be obtained on this surface.

The following examples illustrate the present invention.

EXAMPLES

A synthesis plant is fed with gaseous ethylene at room temperature at a pressure of $3 \times 10^6$ Pa. This gas is liquefied in a condenser at a temperature of $-15°$ C. at a pressure of $3 \times 10^6$ Pa.

A diaphragm pump with a refrigerated head draws in this liquid ethylene and compresses it to $3 \times 10^7$ Pa. A second diaphragm pump with a refrigerated head raises the pressure to an adjustable value between $8 \times 10^7$ and $25 \times 10^7$ Pa and, in the present case, to $15 \times 10^7$ Pa (reactor pressure).

The ethylene continuously enters a stirred tubular reactor 1.5 m in length and 21 mm in diameter.

The fluorinated acrylate in solution in heptane is introduced continuously into the ethylene stream, at the reactor entry, by means of a variable-throughput, high-pressure pump.

tert-Butyl perpivalate or tert-butyl perbenzoate, or a mixture of these two compounds, in solution in heptane, is continuously injected into the reactor head by means of another high-pressure pump.

The copolymerisation commences already at the head of the reactor and continues along the reaction tube where the residence time, which is adjustable, is of the order of 60 seconds.

A pressure-control valve at the exit of the reactor makes it possible to remove the copolymer and the residual monomers.

At the reactor exit the single-phase mixture of copolymer and of residual monomers is directed towards successive separators at pressures of $3 \times 10^7$ Pa and $10^5$ Pa respectively, in which the phase separation is performed, making it possible to separate the copolymer from the unreacted comonomers. The latter are returned into the recycle circuits.

At the end of a trial, the copolymer is collected by opening the low-pressure separators.

The results of the trials are listed in Table 1 in the case of Examples 1 to 26, which relate to the copolymerisation of $C_2H_4$ with

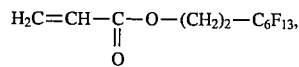

and in Table 2 in the case of Examples 27 to 30, which relate to the copolymerisation of $C_2H_4$ with

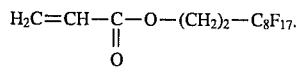

These two tables show the flow rates of both of the monomers introduced, the nature and the entry flow rate of the initiator, the percentage by weight of acrylate introduced in relation to the quantity of ethylene introduced, the degree of conversion of the copolymerisation, the melt index of the copolymer (Melt Index, measured according to ASTM standard 1238-65T) and the acrylate weight content of the copolymer produced (measured by infrared analysis).

In these tables, A denotes tert-butyl perpivalate and B tert-butyl perbenzoate.

The copolymers obtained at conversions of approximately between 8 and 14% have a melt index which makes it easily possible to use them in forming various gliding surfaces, and especially in the manufacture of ski soles.

Examples 19' and 26' are produced by reproducing Examples 19 and 26 in the absence of fluorinated acrylate. Polyethylenes of melt indices which are identical with those of the copolymers of Examples 19 and 26 respectively are obtained.

Sheets of 1 mm thickness are manufactured by compression moulding at 180° C. of the (co)polymers obtained in Examples 19, 26, 19' and 26'.

The free surface energy of these sheets, measured according to ISO standard 8296, changes from 31 mN/m in the case of the polyethylenes of Examples 19' and 26', to values of less than 22.6 mN/m (lower measurement limit of this standard) in the case of the copolymers of Examples 19 and 26 according to the invention. Such a decrease in the surface tension due to the introduction of the fluorinated comonomer is considerable and illustrates the adaptation of the copolymers according to the invention to form excellent gliding surfaces.

TABLE I

| Example | $C_2H_4$ flow rate (g/h) | Acrylate flow rate (g/h) | Initiator | Initiator flow rate (g/h) | % acrylate introduced (weight) | Degree of conversion % | Melt Index | % acrylate (weight) in the copolymer (IR analysis) |
| --- | --- | --- | --- | --- | --- | --- | --- | --- |
| 1 | 3750 | 26.4 | A | 4.47 | 0.70 | 9.00 | 4.3 | 6.4 |
| 2 | 3718.75 | 27.1 | A | 6.3 | 0.72 | 8.81 | 5.6 | 5.60 |
| 3 | 3600 | 26.4 | A | 7.785 | 0.73 | 12.13 | 5.7 | 3.40 |
| 4 | 3571.25 | 26.4 | B | 1.248 | 0.73 | 8.34 | 22.8 | 6.30 |

TABLE I-continued

| Example | C$_2$H$_4$ flow rate (g/h) | Acrylate flow rate (g/h) | Initiator | Initiator flow rate (g/h) | % acrylate introduced (weight) | Degree of conversion % | Melt Index | % acrylate (weight) in the copolymer (IR analysis) |
|---|---|---|---|---|---|---|---|---|
| 5 | 3718.75 | 15.7 | B | 1.044 | 0.42 | 10.18 | 27 | 3.20 |
| 6 | 4326.25 | 19.1 | B + A | 0.378 0.339 | 0.44 | 11.28 | 1.8 | 3.2 |
| 7 | 4591.25 | 18.3 | B + A | 0.444 0.398 | 0.40 | 11.50 | 1.8 | 3 |
| 8 | 3750 | 27.8 | A | 6.36 | 0.74 | 11.12 | 3.2 | 3.9 |
| 9 | 3688.75 | 30 | A | 7.77 | 0.81 | 13.07 | 19.7 to 22.9 | 3.9 |
| 10 | 3688.75 | 31.2 | A | 7.77 | 0.84 | 12.07 | 6.2 | 4.7 |
| 11 | 3812.5 | 31.2 | A | 8.10 | 0.81 | 12.32 | 13.9 to 15.9 | 4.9 |
| 12 | 3718.75 | 31.6 | A | 8.19 | 0.84 | 12.16 | 8.2 to 10 | 6 |
| 13 | 3835 | 29.04 | A | 4.635 | 0.75 | 13.59 | 9.5 | 2.30 |
| 14 | 3807.5 | 30.1 | A | 3.915 | 0.78 | 9.85 | 16.5 | 5.40 |
| 15 | 3750 | 30.5 | B | 0.357 | 0.81 | 8.46 | 9.15 | 5.70 |
| 16 | 3750 | 28.08 | B + A | 0.810 0.405 | 0.74 | 7.41 | 1.5 | 6.50 |
| 17 | 4437.5 | 30.2 | B | 0.420 | 0.68 | 10.30 | 8 | 3.90 |
| 18 | 4475 | 31.3 | B | 0.400 | 0.69 | 9.54 | 4.2 | 5.60 |
| 19 | 4500 | 27.1 | B | 0.390 | 0.60 | 9.83 | 5 | 4.6 |
| 20 | 4500 | 28.8 | B | 0.373 | 0.64 | 9.27 | 3.5 | 5.3 |
| 21 | 4500 | 29.4 | B | 0.375 | 0.65 | 7.73 | 3 | 5.7 |
| 22 | 4500 | 24.84 | B | 0.375 | 0.55 | 9.15 | 2.5 | 4.5 |
| 23 | 4500 | 24.7 | B | 0.380 | 0.55 | 10.08 | 5.5 | 3.9 |
| 24 | 4500 | 24.5 | B | 0.373 | 0.54 | 10.45 | 4 | 3.6 |
| 25 | 4500 | 24.7 | B | 0.370 | 0.55 | 10.12 | 3.7 | 3.7 |
| 26 | 4500 | 25.3 | B | 0.365 | 0.56 | 11.31 | 4 | 4.4 |

TABLE II

| Example | C$_2$H$_4$ flow rate (g/h) | Acrylate flow rate (g/h) | Initiator | Initiator flow rate (g/h) | % acrylate introduced (weight) | Degree of conversion % | Melt Index | % acrylate (weight) in the copolymer (IR analysis) |
|---|---|---|---|---|---|---|---|---|
| 27 | 3846.25 | 30.2 | A | 7.14 | 0.78 | 11.61 | 7.9 | 6.50 |
| 28 | 3796.25 | 31.4 | A | 8.58 | 0.82 | 13.59 | 11.5 to 13.6 | 4.80 |
| 29 | 3875 | 31.6 | A | 5.70 | 0.81 | 12.59 | 5.2 | 6.30 |
| 30 | 3812.5 | 31.3 | A | 5.70 | 0.81 | 13.35 | 6.8 | 6.20 |

I claim:

1. A method for protecting a surface by imparting a hydrophobic nature to it which comprises applying to said surface a layer of a copolymer of monomers of formula:

(I)

in which

R$_1$, R$_2$, R$_3$ and R$_4$ are hydrogen, or

R$_1$ is selected from chlorine and fluorine and R$_2$, R$_3$ and R$_4$ are hydrogen, or R$_1$ and R$_2$ are both selected from chlorine and fluorine and R$_3$ and R$_4$ are hydrogen, or R$_1$ is phenyl and R$_2$, R$_3$ and R$_4$ are hydrogen, with fluorinated (meth)acrylates of the formula:

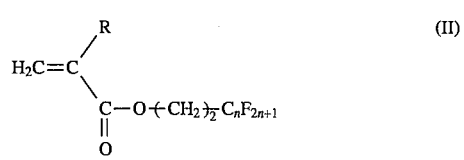

(II)

in which

R is selected from hydrogen and methyl, and n is an integer greater than or equal to 1, wherein the copolymers exhibit a random chain sequencing of comonomers and contain 0.1 to 30% by weight of said fluorinated (meth)acrylates.

2. The method of claim 1 in which the monomer of formula (I) is ethylene and, in formula (II), R is hydrogen and n is between 4 and 10.

3. The method of claim 1 in which, in formula (II), n is a number from 6 to 8.

4. The method of claim 1 wherein the copolymer contains 1 to 20% by weight of (meth)acrylates.

5. The method of claim 1 wherein the copolymer is prepared by a process of bulk copolymerization of monomers of formula (I) and of fluorinated (meth)acrylates of formula (II) comprising the steps of providing a monomer of formula (I) in the gaseous state, introducing the gaseous monomer of formula (I) into a reactor in a gradual manner to a pressure of between 8×10$^7$ and 25×10$^7$ Pa, injecting a fluorinated (meth)acrylate comonomer of formula (II) and a copolymerization initiator into the stream of monomer of formula (I) at the entry of the reactor, maintaining the reactants at a temperature of 150° to 300° C. for 10 seconds to 5 minutes, and removing the copolymer and the residual monomers and separating them by gradually lowering the pressure.

6. The method of claim 5, in which the quantity of fluorinated (meth)acrylate introduced represents 0.1 to 2% by weight of the quantity of monomer of formula (I) introduced.

7. The method of claim 6, in which the quantity of fluorinated (meth)acrylate introduced represents 0.3 to 1% by weight of the quantity of monomer of formula (I) introduced.

8. The method of claim 5, in which the copolymerization initiator is a member selected from the group consisting of tert-butyl perpivalate, tert-butyl perbenzoate, and mixtures thereof.

9. The method of claim 5, in which the quantity of copolymerization initiator used represents 0,001 to 5% by weight, relative to the total quantity of monomers introduced.

10. The method of claim 9, in which the quantity of copolymerization initiator used represents 0,005 to 2% by weight, relative to the total quantity of monomers introduced.

11. The method of claim 5, in which the reaction time is between 30 seconds and 2 minutes.

* * * * *